UNITED STATES PATENT OFFICE.

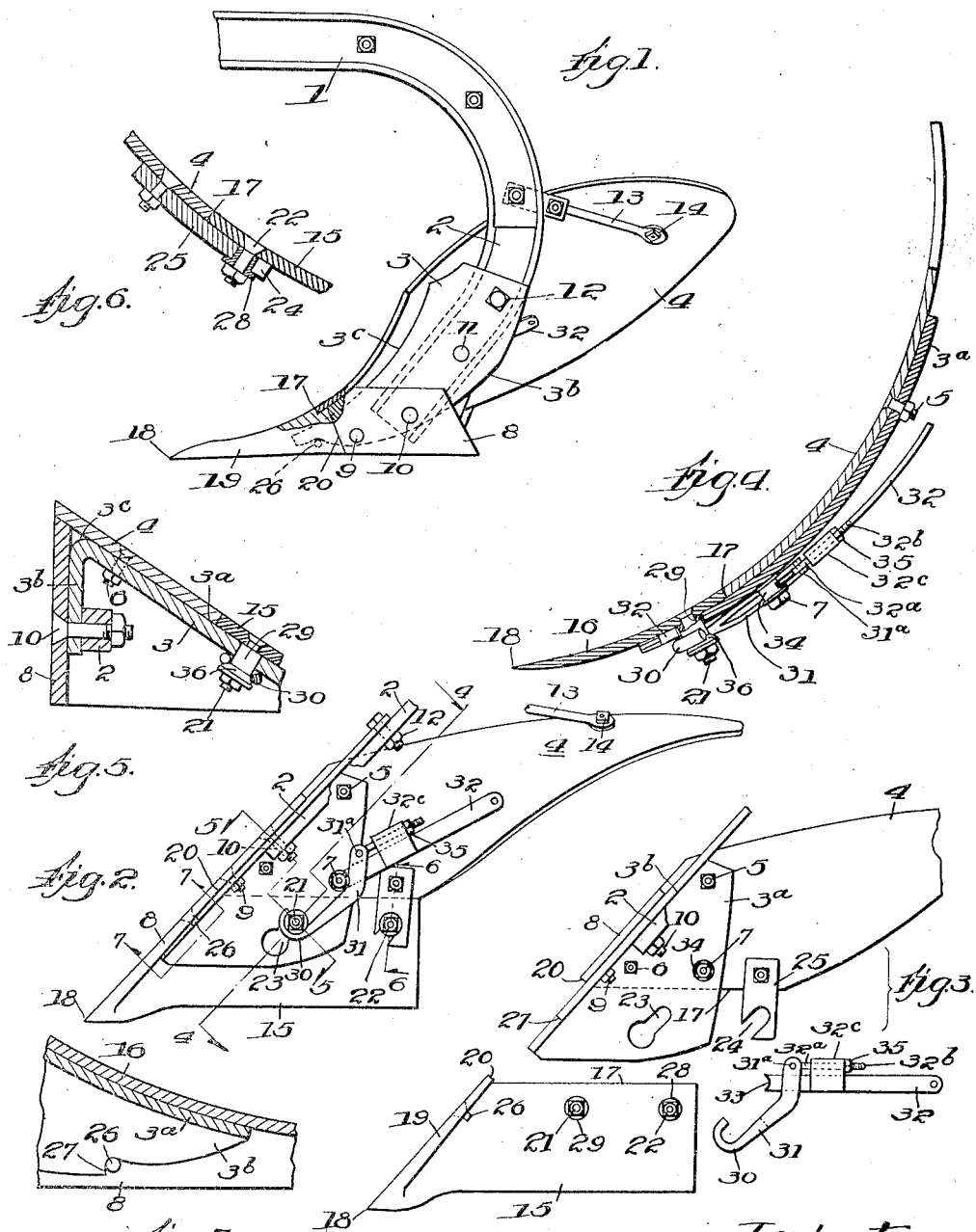

JOSEPH BODA, OF PLANO, ILLINOIS, ASSIGNOR, BY MESNE ASSIGNMENTS, TO MOLINE PLOW COMPANY, A CORPORATION OF ILLINOIS.

QUICK-DETACHABLE PLOWSHARE.

1,359,663.   Specification of Letters Patent.   Patented Nov. 23, 1920.

Continuation of application Serial No. 310,466, filed July 12, 1919. This application filed December 1, 1919. Serial No. 341,636.

*To all whom it may concern:*

Be it known that I, JOSEPH BODA, a citizen of the United States, residing at Plano, in the county of Kendall and the State of Illinois, have invented certain new and useful Improvements in Quick-Detachable Plowshares, of which the following is a specification, reference being had to the accompanying drawings, forming a part thereof.

This application is a continuation of my application filed July 12, 1919, Serial No. 310,466, entitled Plow share support. The purpose of the invention is to provide in combination with a plow share mold board a support with means for detachably securing the plow share to permit its quick and easy removal for sharpening or replacement. The invention consists in the construction and arrangement of these coöperating parts hereinafter described and shown in the drawings as indicated in the claims.

In the drawings:

Figure 1 is a side elevation of the rear portion of a plow beam with the mold board and plow share attached thereto embodying this invention.

Fig. 2 is a bottom plan view of the parts shown in Fig. 1.

Fig. 3 is also a bottom plan view of the parts, but showing them disengaged from each other.

Fig. 4 is a section taken as indicated at the line, 4—4, on Fig. 2.

Fig. 5 is a detail section taken as indicated at the line, 5—5, on Fig. 2.

Fig. 6 is a detail section taken as indicated at the line, 6—6, on Fig. 2.

Fig. 7 is a detail section taken as indicated at the line, 7—7, on Fig. 2.

As shown in Fig. 1, the plow beam, 1, has its rear end portion, 2, curved downwardly in the usual manner; and attached thereto is a frog, 3, formed of heavy sheet metal and comprising the two portions, $3^a$, and $3^b$, folded at an acute angle to each other along a curved line of fold at $3^c$, and serving to support respectively the mold board and the land-side, which are left in place when the plow share itself is removed. The mold board, 4, is fastened to the portion, $3^a$, of the bracket by bolts, 5, 6 and 7, as shown in Figs. 2, 3 and 4, and the plate, 8, serving as the land-side, is attached to the other arm, $3^b$, of the frog, by bolts, 9 and 10, as shown in Fig. 1. The frog member, 3, itself is secured to the curved end, 2 of the plow beam by means of bolts, 10, 11 and 12, and for all ordinary purposes is thus permanently attached together with mold board, 4, and the land-side, 8. As is usual, the mold board is braced by a strut, 13, attached to its upper portion by a bolt, 14, and extending for connection with the curved portion, 2, of the plow beam, 1.

The detachable plow share, 15, is formed with a curved surface, 16, blending smoothly into the concave surface of the mold board, 4, and joins thereto along a substantially horizontal line, 17, at which the edges of the two parts abut. The lower edge of the plow share is sharpened coming to a point at 18 while at the forward and oblique edge there is forged or welded substantially integral with the plow share, 15, a portion, 19, known as the share land-side and having a flat outer face extending at such an angle to the face of the plow share, 15, as to lie in the same plane as the outer face of the land-side member, 8, said share land-side making a butt joint with the land-side, 8, along the line, 20, when the plow share is attached in working position.

Projecting from the under face of the plow share, 15, are two bolts, 21 and 22, adapted to enter respectively the buttonhole slot, 23, in the frog arm, $3^a$, and the open ended slot, 24, in a splice member, 25, attached to the mold board, 4, adjacent the bracket arm, $3^a$. Simultaneously with the entry of these bolts into said slots, a stud, 26, projecting from the inner face of the share land-side, 19, is engaged with the edge of the arm, $3^b$, at a notch, 27, formed in said edge, this stud serving to maintain a snug fit of the frog in the angle formed between the plow share proper and the share land-side, 19. The bolt, 22, is fitted with a flanged sleeve, 28, between whose flange and the under surface of the plow share there is just room for the thickness of the splice member, 25, thus securing a close fit at this point. The bolt, 21, which enters the buttonhole slot, 23, is likewise fitted with a sleeve, 29, and the parts are drawn up and locked in final position by means of a hook, 30, curved to fit over said sleeve, 29, said hook being the terminal of the link, 31, which is pivotally connected to an adjustable terminal member, 32ª, of the lever, 32, one end of which is formed with a semicircular notch, 33, which fits upon a sleeve on the bolt, 7, serving as a fulcrum for the lever, 32. By first engaging the hook, 30, with the sleeve, 29, on bolt, 21, and then placing the notched end, 33, of lever, 32, upon the fulcrumed sleeve, of bolt, 7, the lever can be swung over so as to draw the bolt, 21, up along the slots, 23, pulling the plow share into final position. The terminal member, 32ª, of said lever, 32, is made adjustable longitudinally of the lever, for the purpose of varying the distance between the fulcrum point of the lever and the point of pivotal connection of the link, 31. For this purpose the terminal member, 32ª, has a threaded shank, 32ᵇ, which extends through a sleeve lug, 32ᶜ, of the edge of the lever, 32, and is provided above that lug with a nut, 35, which serves as an adjustable stop limiting the extension of the fulcrum notch, 33, with respect to the pivotal connection of the link to the lever at 31ª. By means of this nut the effective length of the lever from fulcrum to link connection can be made such that the link length from the bend of the hook to the pivot at 31ª will be barely sufficient to permit said sleeve and pivot to be brought into alinement with the lever fulcrum bolt, 7. Then by swinging the lever, 32, just beyond this position of alinement, the link member, 31, being stopped against the fulcrum bolt, 7, with the parts still under stress, an eccentric lock device is thus constituted for holding the plow share in place. To insure close contact between the member, 3ª, of the frog, 3, and the part of the plow share adjacent the post or sleeve, 29, the flange of the latter is formed with a sloping shoulder, 36, as most clearly seen in Fig. 5, so that the hook, 30, of round stock upon being placed in tension is crowded between said sloping flange, 36, and the face of the frog member, 3ª, thus drawing the inner surface of the plow share onto the bracket. It will be seen that the operation of applying or removing the plow share is thus rendered exceedingly simple, requiring only a single lever movement. In attaching the plow share, the various engaging elements are merely placed in approximately correct position and the swing of the lever, 32, brings them all to their final limits; for unlocking the plow share, the lever is merely pushed or tipped over to position for releasing the tension in the hook, whereupon it can be entirely removed, so as not to interfere with the easy disengagement of the other parts. Furthermore, none of the engaging members are so arranged that they are likely to become rusted in position; the plow share will practically fall off from its support as soon as the lever lock is released.

I claim:—

1. In a plow in combination, a moldboard, a quick-detachable share and a frog, the share and the frog having coöperating parts abutting on each other for guiding the frog approximately parallel to the inclined edge of the share in their relative movement for bringing the share to the mold-board; means for clamping the share to the mold-board comprising a lever fulcrumed on the mold-board at the back side thereof, and a link connecting said abutting part on the share with the lever, said link being adapted to swing past the fulcrum axis to a stop when the lever is operated for tensioning the link to draw and clamp the parts together.

2. In the construction defined in claim 1, the coöperating abutting parts on the share and frog being a stud projecting from the inner side of the land-side member of the share and a slot in the frog extending approximately parallel to the forward inclined edge of the share for engaging the stud.

3. In the construction defined in claim 1 foregoing, the lever fulcrum being a fixed stud on the mold board, and the lever having a notched end adapted to be entered on the stud for fulcruming thereon, the link having a hooked end for disengageably engaging the stud on the share; whereby the entire share-clamping device comprising the lever and link is removable when unclamped, and is securely retained on the plow by the clamping.

4. In the construction defined in claim 1 foregoing, the lever comprising two parts connected together for adjustment to vary the distance between the fulcrum and the connection to the link, and having threaded means for such adjustment.

In testimony whereof I have hereunto set my hand at Plano, in the county of Kendall and State of Illinois.

JOSEPH BODA.